Sept. 26, 1933.                R. J. EVANS                    1,927,976
                             BRAKE LINING RACK
                        Filed April 28, 1933          2 Sheets-Sheet 1

Inventor
R. J. Evans
By Wilkinson & Mawhinney
Attorneys.

Sept. 26, 1933.   R. J. EVANS   1,927,976
BRAKE LINING RACK
Filed April 28, 1933   2 Sheets-Sheet 2
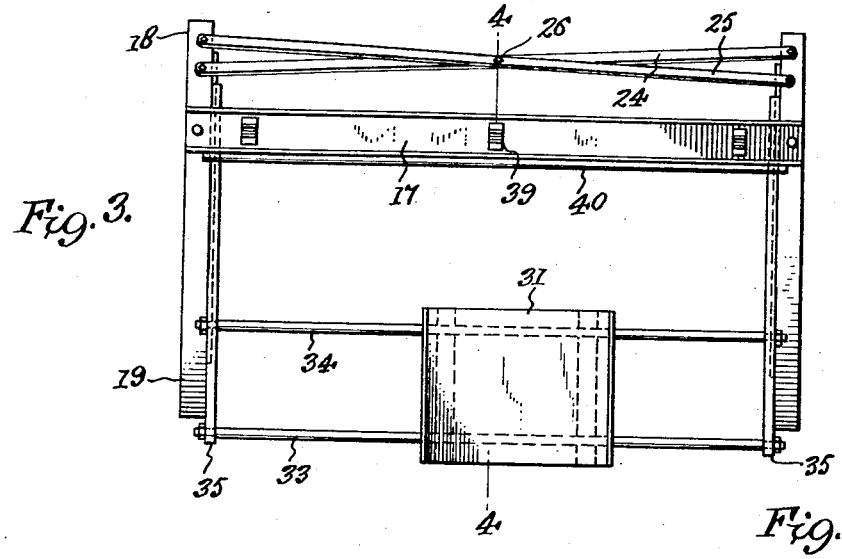
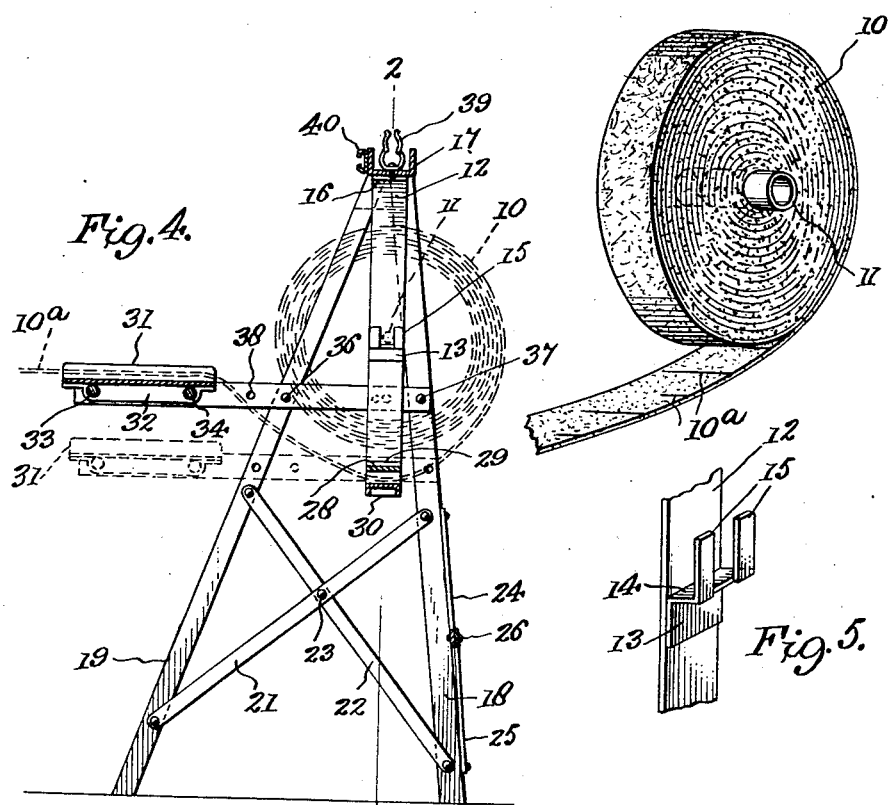
Inventor
R. J. Evans
By Wilkinson & Mawhinney
Attorneys Patented Sept. 26, 1933

1,927,976

UNITED STATES PATENT OFFICE 1,927,976

BRAKE LINING RACK

Richard J. Evans, Huntington, Ind., assignor to Asbestos Manufacturing Company, Huntington, Ind., a corporation of Indiana Application April 28, 1933. Serial No. 668,437

5 Claims. (Cl. 242—55.4)

The present invention relates to improvements in brake lining racks, and has for an object to provide an improved rack for holding brake linings in roll form where a number of rolls of brake lining of various widths or sizes is contained in compact space on the rack for obvious display and ease in withdrawing predetermined lengths of the lining.

The invention also contemplates an improved and attractive rack which is designed to promote sales and to increase the ease with which the brake lining is removed and severed.

With the foregonig and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved brake lining rack constructed in accordance with the present invention.

Figure 3 is a top plan view.

Figure 4 is a section taken on the line 4—4 in Figure 3.

Figure 5 is a fragmentary perspective view showing a form of bracket bearing employed, and Figure 6 is a perspective view of a roll of brake lining and shaft used.

Figure 1:
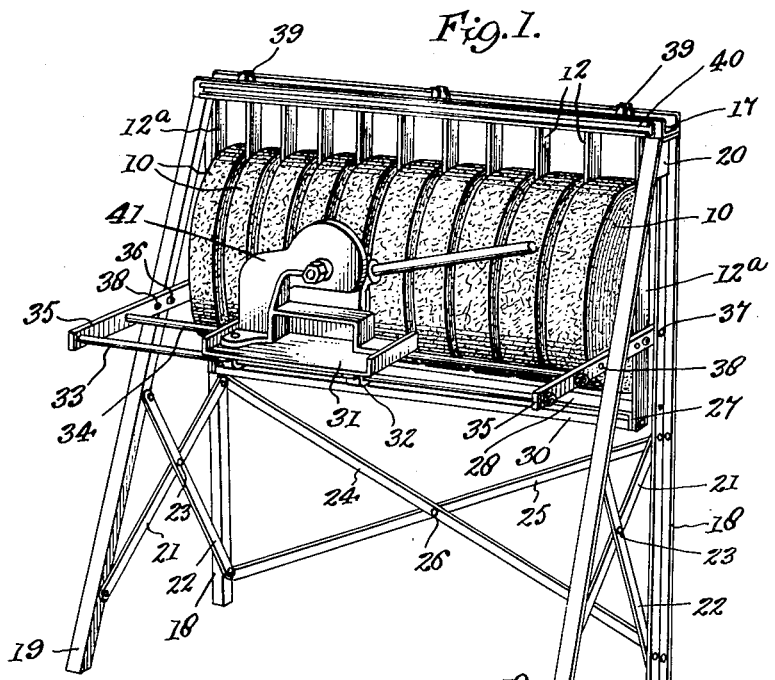

Referring more particularly to the drawings, brake lining at the present time is manufactured in 50 ft. rolls wound on wooden cores with holes drilled in the center for the insertion of an axle. The improved rack is adapted to receive such rolls, the rolls being indicated at 10 and being of various widths, thicknesses and sizes so that a varied and large quantity of the brake material may be kept on hand at all times in the racks. These rolls are mounted upon short hollow and preferably metallic axles 11, which axles project at opposite ends beyond the rolls of brake lining 10 so as to occupy the slotted brackets, shown in Figure 5. The brackets are supported by vertical strips or partitions 12, the brackets having base walls 13 which fit against the strips 12 and are welded, riveted or otherwise secured thereto. Above the base plates 13 are steps 14 extending at substantially right angles out from the plane of the partition strips 12; and at the outer portions of the steps 14 separated bearing fingers 15 rise up which bearing fingers receive therebetween the ends of the axles 11, such axles being supported for rotary movement upon the steps 14.

The present rack is shown as having a capacity to carry ten of the rolls of brake lining varying from one-half to two and one-half inches in width, although it will be of course understood that the rack may be designed to carry any number of rolls. The brackets allow the rolls to work freely.

The upper ends 16 of the partition strips fit beneath a horizontal channel member 17 which extends in common across all of the partition strips and to which all of the ends 16 may be secured, as by welding, riveting or otherwise.

The channel member is supported at its ends upon angle iron or other forms of standards or posts, the rear standards being indicated at 18 and having only a slight inclination to the vertical; and the front standards being designated at 19 and having a greater inclination to the vertical in an opposite direction so that the rear and forward standards converge upwardly so as to both arrive beneath the relatively narrow channel member 17 to which they are affixed by the corner pieces 20 or other form of fastening means. The divergent lower portions of the standards assure a wide purchase of the rack upon the floor or other supporting surface. The front and rear pairs of posts 18 and 19 are secured together by cross braces 21 and 22 which are secured at their central overlapped portions by rivets or other fastenings 23. These cross bracings with the standards constitute end frames for the rack, such end frames being connected together by the diagonal braces 24 and 25 secured to the rear standards 18 and to one another as indicated at 26.

Figure 2:
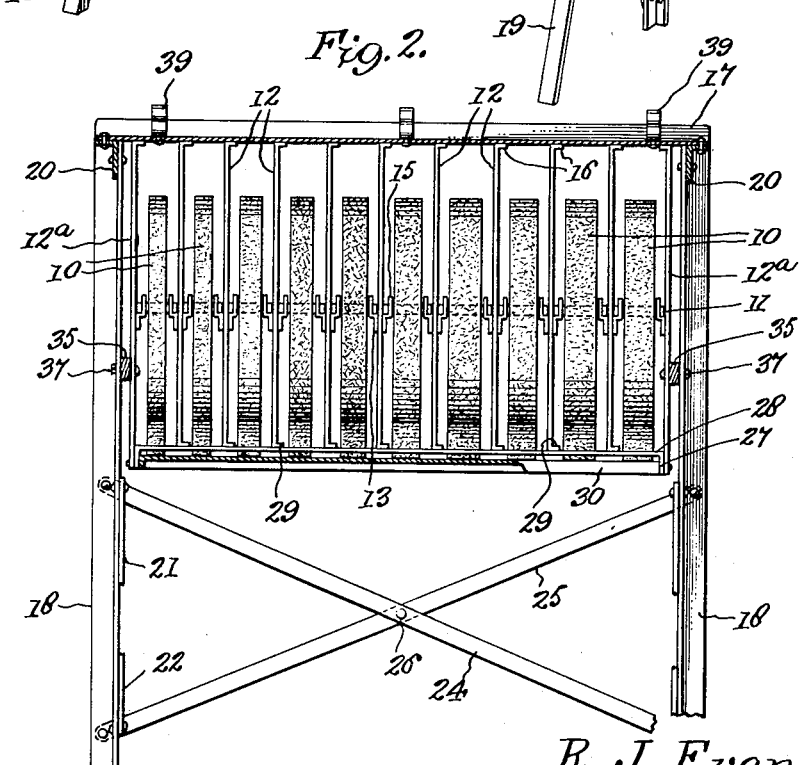
Figure 2 is a vertical section taken on the line 2—2 in Figure 4.

The end partition strips 12ª, as shown in Figure 2, extend down below the intermediate partition strips 12 and have their lower ends straight to receive thereagainst the downturned ends 27 of a flat guide strip 28 which extend across from one end partition strip 12ª to the opposite end partition strip 12ª and beneath all of the shorter intermediate partition strips 12, which latter partition strips have their angularly turned ends 29 resting upon the guide strip 28, being preferably welded or otherwise secured thereto. The ends 27 of the guide strip 28 are welded or otherwise secured to the end partition strips 12ª. These end partition strips 12ª also support a bottom guide channel strip 30 spaced below the upper guide strip 28 and providing a guide space between these strips 28 and 30 through which the end portions 10ª of the asbestos or other brake linings from the rolls are brought prior to being trained over the traveling table 31 which carries the cutter 41 of any desired form. This traveling table or plate 31 is formed with claws 32 for engaging about a pair of rods 33 and 34 carried at the forward portion of the rack by means of supporting arms 35 or the like. Such supporting arms may be affixed by bolts, rivets or other fastening means 36 and 37 respectively to the posts 19 and 18 and additional holes 38 are preferably provided in the arms 35 to permit of lowering same to the dotted line position shown in Figure 4; whereby the holes 38 will then arrive in registry with similar holes upon the widened standards. The arms 35 may also be secured to strips 12ᵃ in a similar manner.

In the top channel member 17 are mounted a number of spring clips or the like devices 39 for holding placards or the like; and at the front portion of said upper channel member 17 is provided a guide strip 40 which may receive a card or strip on which the sizes of the various rolls of brake lining are indicated.

In the use of the device the ends 10ᵃ of the rolls of brake lining are passed through the slot formed between the guide strips 28 and 30. This holds the rolls from unrolling and falling to the floor. Each roll is marked off in 6" and 12" lengths to make it easy for the clerk to count off the number of feet and inches required instead of having to pull the roll out on the floor and use a measuring stick.

Figure 4 shows how the lining may be pulled out and across the table whereby the clerk may employ the cutter to cut off the required amount after the clerk has counted off the number of feet and inches required.

The cutter and table 31 can be slid to and fro on the rods 33 and 34 to a position in front of each roll of brake lining so that any size can be conveniently cut off. Also the cutter may be raised or lowered to suit the relative positions of the rack and the operator; that is, if it is necessary to place the rack upon a stoop or other elevation and the operator must stand below the elevation, the cutter may be lowered and if the rack is placed on the same level with the operator the cutter may be raised.

This is accomplished, as shown in Figure 4, by raising or lowering the arms 35 and is for the purpose of making it easier for the clerk to operate the cutter whereby the full pressure may be applied when the lining is cut off. The strips received in the slide 40 show the size, catalogue number and other data pertaining to the rolls. Advertising placards may be placed in the clips 39.

It will be appreciated from the foregoing that the improved brake lining rack is useful both for display purposes and practicability.

It is obvious that various changes and modifications may be made in the details of construction and design of the above specifically described embodiment of the invention without departing from the spirit thereof, such changes and modifications being restricted only by the scope of the following claims:—

What is claimed is:—

1. In a brake lining rack, a rack frame, holders in the frame for rotatably supporting rolls of brake lining, guide means for slidably receiving the free end portions of the lining coming off the rolls, and a table movably mounted on the frame in front of the rolls for receiving the lining from the guide means.

2. In a brake lining rack, a rack frame, holders in the frame for rotatably supporting rolls of brake lining, guide means in the frame below the rolls for slidably receiving the free end portions of the rolls, a table slidable across and in front of the various rolls for receiving the end portions of the brake lining from said guide means, and a cutter carried by said table.

3. In a brake lining rack, end supporting frames, means for tying said frames together, a top supporting member carried by said frames, a plurality of intermediate partition strips extending in spaced relation downwardly from said top supporting member, longer end partition strips also depending from said top supporting member, holders carried by said partition strips for removably and rotatably receiving rolls of brake lining, a top guide strip abutting the lower ends of said intermediate partition strips and having end portions receiving against and supported by the longer end partition strips, and a second companion guide strip supported by the end partition strips spaced below the first mentioned guide strip and providing therewith a slot for receiving the end portions of the brake lining rolls.

4. In a brake lining rack, a rack frame, holders in the frame for rotatably supporting rolls of brake lining, arms extending outwardly from the frame in front of the rolls, adjustable means for adjusting the height of said arms, rods secured between said arms, and a table slidably supported on said rods.

5. In a brake lining rack, end frames composed of upwardly convergent standards and braces for securing the standards together, a top supporting channel member seated upon the upper convergent ends of the standards of both end frames, means securing the top channel member to said standards, partition means below the top supporting member, holders on the partition members for rolls of brake lining, guide means carried below the rolls for receiving the free ends of the rolls, arms secured to the standards and to the partition means, rods secured between the arms in front of the rolls, a table slidably mounted on the rods, and a cutter carried by the table.

RICHARD J. EVANS.